(12) United States Patent
Schoenauer et al.

(10) Patent No.: US 11,023,067 B2
(45) Date of Patent: Jun. 1, 2021

(54) INPUT CONTROL USING FINGERPRINTS

(71) Applicant: Intel Corporation, Santa Clara, CA (US)

(72) Inventors: Tim Schoenauer, Feldkirchen (DE); Bernhard Raaf, Neuried (DE)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 16/226,530

(22) Filed: Dec. 19, 2018

(65) Prior Publication Data

US 2019/0121481 A1 Apr. 25, 2019

(51) Int. Cl.
*G06F 3/0488* (2013.01)
*G06F 3/0487* (2013.01)
*G06F 3/041* (2006.01)
*G06K 9/00* (2006.01)

(52) U.S. Cl.
CPC .......... *G06F 3/0416* (2013.01); *G06F 3/0412* (2013.01); *G06F 3/0487* (2013.01); *G06F 3/04883* (2013.01); *G06K 9/00006* (2013.01); *G06K 9/00355* (2013.01); *G06F 2200/1636* (2013.01); *G06F 2203/0338* (2013.01)

(58) Field of Classification Search
CPC ............. G06D 9/00885; G06K 9/0002; G06K 9/00087; G06K 9/00013; G06F 3/0488; G06F 21/32; G06F 3/04883; H04L 63/0861; H04R 1/1041
See application file for complete search history.

(56) References Cited

U.S. PATENT DOCUMENTS

| | | | | |
|---|---|---|---|---|
| 7,831,070 B1* | 11/2010 | Cheng | ............... | G06K 9/00013 382/124 |
| 8,819,812 B1* | 8/2014 | Weber | ..................... | G06F 21/31 726/19 |
| 9,489,086 B1* | 11/2016 | Marsden | ............. | G06F 3/04886 |
| 2008/0130910 A1* | 6/2008 | Jobling | ............... | G06F 3/04883 381/74 |
| 2008/0317292 A1* | 12/2008 | Baker | ................ | G06K 9/00885 382/115 |
| 2010/0050133 A1* | 2/2010 | Nishihara | ............. | G06F 3/0425 715/863 |
| 2010/0110031 A1* | 5/2010 | Miyazawa | ............ | G06F 3/0488 345/173 |
| 2014/0218311 A1* | 8/2014 | Huang | .................. | G06F 3/0488 345/173 |
| 2014/0348341 A1* | 11/2014 | Akaike | ................ | H04R 1/1041 381/74 |
| 2015/0016695 A1* | 1/2015 | Yoon | .................. | G06K 9/00087 382/124 |

(Continued)

*Primary Examiner* — Ke Xiao
*Assistant Examiner* — James S Nokham
(74) *Attorney, Agent, or Firm* — Schwabe, Williamson & Wyatt, P.C.

(57) ABSTRACT

A device may be controlled using a fingerprint input. Data indicative of a fingerprint is received from a sensor. It is determined that the fingerprint is associated with a first finger profile that is usable to distinguish a first finger from other fingers of a user of the device. A user control that is associated with the finger profile is identified. The user control is configured to control a setting of a function executing on the device. The user control is input to control the first setting.

14 Claims, 16 Drawing Sheets

(56) References Cited

U.S. PATENT DOCUMENTS

| | | | |
|---|---|---|---|
| 2015/0143277 A1* | 5/2015 | Yoon .................... | G06F 3/04883 |
| | | | 715/773 |
| 2016/0063230 A1* | 3/2016 | Alten ...................... | G06F 21/32 |
| | | | 726/28 |
| 2018/0011590 A1* | 1/2018 | Lee .................... | G06K 9/00355 |
| 2018/0276440 A1* | 9/2018 | Strohmann .......... | G06K 9/0002 |
| 2020/0159897 A1* | 5/2020 | Schmitt ............... | H04L 63/0861 |

\* cited by examiner

INPUT CONTROL USING FINGERPRINTS

BACKGROUND

Many mobile devices operate using buttons, a touch input using a connected touch-sensitive display, or a combination. User inputs may be used to enter information, zoom-in/out on photos, scroll through pages, adjust audio volume, or otherwise interact with the mobile device. For example, a headset typically requires users to perform several basic control tasks such as start/stop playing music, volume up/down, song forward/backward, take a call, reject call, etc. Many devices that use a touch-sensitive display are eliminating buttons in favor of increasing the screen size. And with increasing miniaturization of devices and the use of wireless technologies to eliminate wires, it is becoming more challenging to provide a user-friendly interface to allow for such control tasks. For example, some Bluetooth headsets are now provided as wireless earpieces that no longer have user controls typically provided on a controller attached to an earpiece cable. In particular, in cases where the user is engaged in physical activity such as listening to music via a Bluetooth headset while running, the user may find it difficult or impossible to operate small-sized elements such as small buttons placed close to each other. Many such situations are more easily facilitated using larger elements that can be accessed and operated easily while the rest of the body is in motion.

It is with respect to these considerations and others that the disclosure made herein is presented. This Background is provided to introduce a brief context for the Detailed Description that follows. This Background is not intended to be an aid in determining the scope of the claimed subject matter nor be viewed as limiting the claimed subject matter to implementations that solve any or all of the disadvantages or problems presented above.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
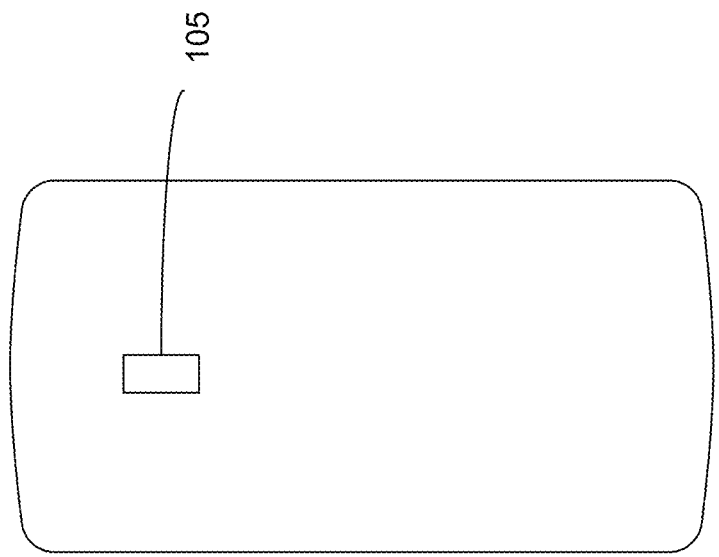
FIG. 1 illustrates an example device with a fingerprint sensor according to one embodiment.
Figure 1:
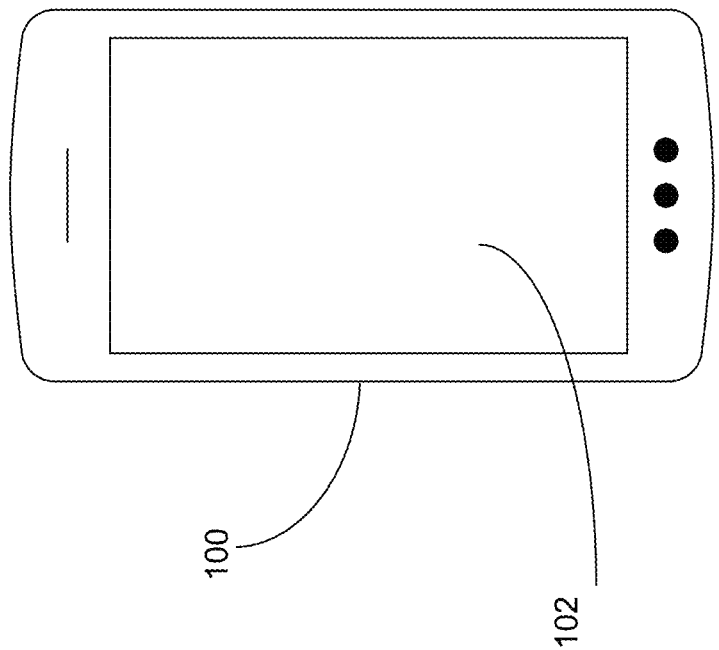

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

One way to address the problem of providing user controls with limited input controls or while the user is unable to easily provide control inputs is by providing a button or other area/part of the device that is accessible by the user's finger. The user may touch this button or area and a touch detection element or a button press detection element may translate the input to a control action (e.g., start/stop playing music). In order to allow for more than a single control action, the user may use tapping patterns to trigger actions (e.g., a double tap to indicate a fast-forward to the next song). While tapping a button may provide a way to control an action, only a limited number of control actions can be encoded before it may be cumbersome for the user to memorize and enter an increasing number of patterns that correspond to various actions. For example, a single tap or a double tap may be easy to remember and use, but additional patterns such as three taps or a tap pattern with long and short taps may be difficult or confusing to use.

Another way to address the problem of providing user controls with limited input controls or while the user is unable to easily provide control inputs is by providing voice-activated controls. The user may speak into a device microphone, and a speech recognition function may be used to detect and execute a command. However, the use of voice to control a device may be limited in a number of situations. Speaking into a device may disturb or draw undesired attention in many environments. Furthermore, it may not be possible or desirable to speak into a device during some activities such as running or working out.

Disclosed herein are methods and systems for manipulating or controlling a device using the user's fingerprints to manipulate functions on a device. Such manipulating or controlling techniques may be associated with device power control, volume control, zooming, and virtual feedback, among other scenarios. In at least some embodiments, a device may include or have access to a fingerprint sensor and recognizer that is configured to detect which of the user's fingers is touching the sensor. The fingerprint sensor and recognizer may further be configured to detect movement patterns of the finger, such as tap-and-twist and tap-and-move-up/down. Based on a detected finger, a control action (e.g., volume up) can be mapped to a function or application running on the device. Furthermore, the device may also be configured to detect a moving pattern (rotation or lateral movement) of a finger and determine additional information that can be used to control the device. For example, the middle finger can be assigned to volume control, and a clockwise rotating movement or an upward movement may be used to distinguish a volume-up command or a desired setting of the volume-up command. Additionally, an orientation of the finger while the finger is touching the sensor can be used to further distinguish commands (e.g., pointing upward, forward, or backward).

By providing a way to control a device by detecting which finger is touching the device and/or detecting movement patterns of the finger, control actions can be decoded in a user-friendly way that can enable a plurality of input controls using a limited amount of device space. Additionally, control actions can be decoded in a way that requires less input accuracy and/or precision by the user. In various embodiments, for one or more fingers of a user, a selected control activity can be mapped for a tap or touch of that finger. By distinguishing the fingers of a user, up to ten control actions can be mapped if the user has two hands and five fingers on each hand. An assignment of a control action to a finger may be more intuitive and much easier for a user to memorize than a complex tapping pattern. Furthermore, by including fingertip movement (rotation and/or translation or lateral movement) and orientation detection of the finger tips, further control activity actions and settings can be encoded.

The use of fingerprint and fingertip motion detection to control a device may be particularly useful on smaller devices which may only offer a limited amount of surface area for sensors. The use of fingerprint and fingertip motion detection to control a device may also be useful when it is difficult for a user to provide precise or complex control inputs to a device, such as adjusting a sliding control, selecting and touching specific areas of a control/input surface, scrolling, controlling a cursor, and the like. Volume control is one example of a complex operation that may be difficult with limited input space or when the user is unable to provide precise controls, such as when the user is running or using an exercise machine. Additionally, speech control inputs may not be possible or may be inconvenient for a user to employ when in a crowded location, a noisy location, or when the user is engaged in physical activity.

Fingerprint sensors are becoming increasingly popular in many mobile devices. However, fingerprints are typically used to verify and authenticate the identity of a user and therefore requires a high degree of accuracy and a high degree of confidence that a particular finger has been positively identified against thousands or millions of other possible fingerprints. In the present disclosure, the fingerprint sensor and associated detection function need only distinguish as many fingers as is desired for device control functions, typically up to 10 unique IDs for each finger in a typical user. In some embodiments, the distinctions between fingers may be accomplished with only a small portion of the finger exposed to the fingerprint sensor. While the portion of the finger may not be unique amongst the fingers of millions of other possible users, there may be a high likelihood that the portion will be unique among the ten fingers of the user of the device. This can significantly reduce the complexity of the fingerprint recognition functionality, allowing for improvements in speed and efficiency of processing and reduction in use of various computing resources such as memory and bandwidth.

The described techniques may be implemented on any type of device where a user can provide inputs to control one or more functions on the device, an application running on the device, or a second device that is coupled to the device. The fingerprint sensor may be located on the device itself or another device that is communicatively coupled to the device. The analysis and recognition of the fingerprint input as well as device control processing and management can be implemented on the device, at another device, at the fingerprint sensor, or a combination. The device may be a standalone device such as a smartphone, smart watch, table, or headset, such as a Bluetooth earpiece that may be used in conjunction with a smartphone, smartwatch or other master device. Further advantages of this configuration are that the detection circuitry needs only to be implemented once in the master device (which may have its own fingerprint sensor as well) and not necessarily for each component.

FIG. 1 illustrates an example mobile device that may incorporate aspects of the disclosed techniques. Mobile device 100 may include display 102 and sensor 105. Mobile device 100 may be a handheld device (e.g., smartphone), a personal digital assistant (PDA), a laptop, a netbook, tablet, smartwatch, or other device. Sensor 105 may be located on a rear portion of mobile device 100 and may include a fingerprint sensor. The rear of mobile device 100 may be the side opposite a primary display (e.g., there may be a large display in front and smaller display in rear). Sensor 105 may be located anywhere on mobile device 100. The sensing of a user's fingertip may be based on optical scanning, capacitance scanning, or other techniques that are known in the art. Display 102 may include an array of touch sensors that detect and process touch events (e.g., touching of fingers or other objects upon a touch-sensitive surface at particular coordinates within x-y dimensions of the screen) and hover sensors that detect and process hover events (e.g., close proximity hovering of fingers or other objects above display 102).

Figure 2:
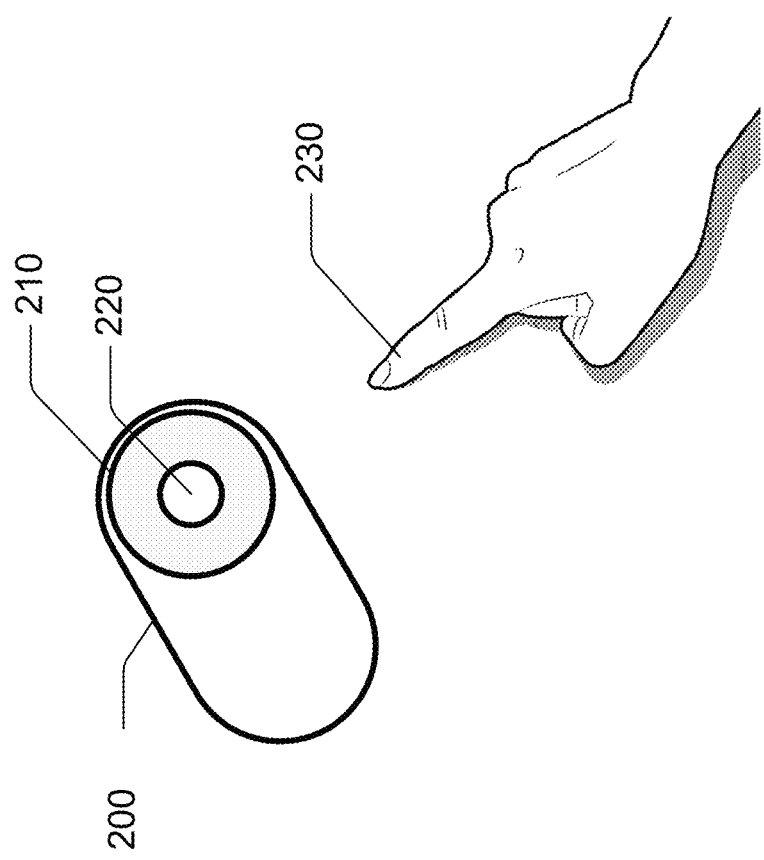
FIG. 2 illustrates an example with a fingerprint sensor according to another embodiment.

FIG. 2 illustrates an example earpiece 200 that may include a speaker element 210 and a fingerprint sensor 220. A user may touch the fingerprint sensor 220 with a fingertip 230. The fingerprint sensor 220 may be configured to detect the presence of a finger and invoke a function to capture data using optical, capacitive, or other techniques. The fingerprint sensor 220 may send the captured data to another device for processing, or may provide the data to a function (not shown in FIG. 2) that is running on the earpiece 200.

Devices such as those shown in FIG. 2 may communicate with another device, such as that shown in FIG. 1, using a communications protocol such as Bluetooth. In an embodiment, one or more such devices may be communicatively coupled, where an endpoint may refer to a terminal point in a communications channel between BLUETOOTH-enabled devices. For example, a smartphone might correspond to a first endpoint of an ad hoc, BLUETOOTH-based communications network. A wireless headset may correspond to a second endpoint of the communications network. Messages may be sent between the two endpoints using BLUETOOTH-compatible media and protocols, including but not limited to WIFI or BLUETOOTH radio. Embodiments may include BLUETOOTH profiles. A BLUETOOTH profile may correspond to a specification or protocol for accessing a service of a BLUETOOTH device. Examples of BLUETOOTH profiles include Advanced Audio Distribution Profile ("A2DP"), Headset Profile ("HSP"), and the Hands-Free Profile ("HFP"). The services performed may relate to aspects of audio playback, including but not limited to connecting to playback devices, initiating and suspending playback, adjusting audio volume level, and so forth.

Figure 3B:
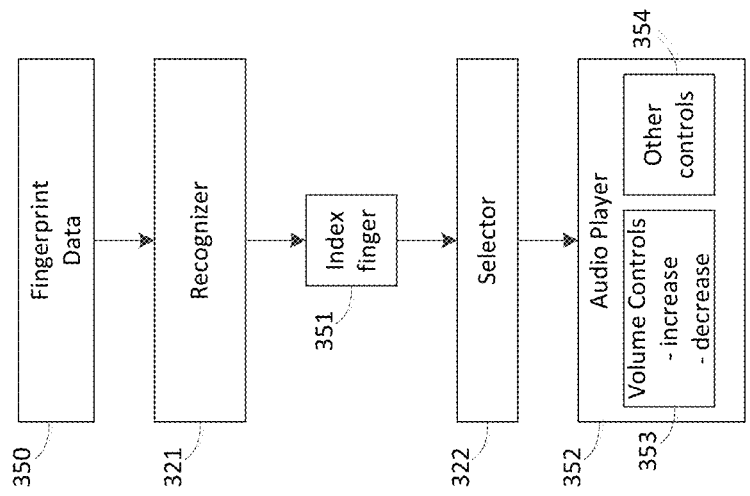
FIG. 3b illustrates an example application of device control according to another embodiment.
Figure 3A:
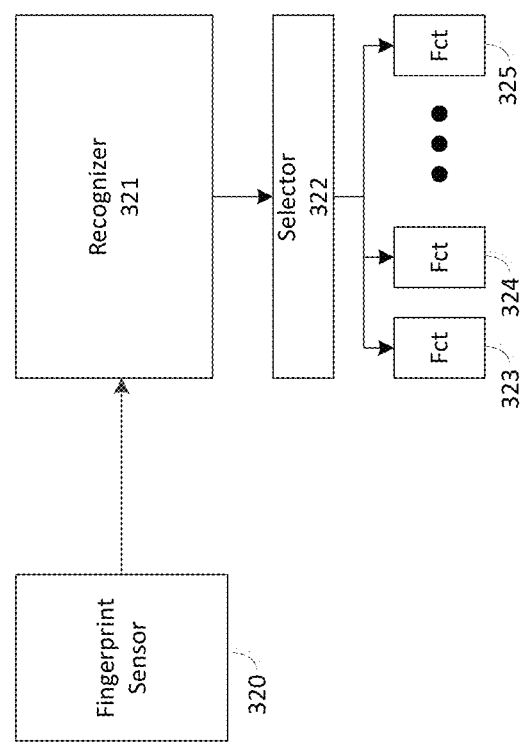
FIG. 3a illustrates an example system for device control according to another embodiment.

FIG. 3a illustrates an example system for device control according to another embodiment. Features and advantages of the present disclosure include a recognizer 321 coupled to receive fingerprint data from a fingerprint sensor 320. Advantageously, recognizer 321 may be trained to recognize different fingers of the same user (or multiple users). For example, a user may train recognizer 321 to distinguish between different fingers of the user (e.g., ring finger versus thumb versus pointer finger, etc. . . . ). Accordingly, when a user touches the fingerprint sensor 320, recognizer 321 may produce different outputs depending on which finger the user touched the sensor with. Advantageously, different outputs corresponding to different fingers of the same user may be used to invoke different functions of an electronic device. For example, the output of recognizer 321 may be processed by a selector 322. Selector 322 invokes different functions 323-325. For example, one recognized finger may invoke a function for changing the volume of a speaker, and another recognized finger may invoke a function for changing a song being played through the speaker. Any number of different functions may be invoked based on different fingers being recognized, for example. In one embodiment, fingerprint sensor 320, recognizer 321, selector 322, and functions 323-325 are on a single electronic device (e.g., a headset for playing music, such as an earpiece). Alternatively, one or more of the components shown in FIG. 3a may be on one or more other devices and coupled together over a network. For example, some components may reside on one part of a headset (e.g., on one earpiece), while other components may reside on another part of the headset (e.g., on another earpiece), or on a mobile device as described in more detail below.

FIG. 3b illustrates an example application of device control according to another embodiment. In this example, fingerprint data 350 (e.g., from fingerprint sensor 320) is received by a recognizer 321. Recognizer 321 may be trained to recognized the fingerprint data 350 and determine that fingerprint data 350 is associated with a particular finger profile (e.g., data describing an index finger used to train recognizer 321). Accordingly, recognizer 321 may generate an output 351 specifying that the index finger was recognized from the fingerprint data 350. Selector 322 may receive the output 351 from recognizer 321 and identify a particular user control based on the recognizer output (here, the index finger). In this example, the user control associated with the index finger profile may be an "increase volume" of an audio player function executing on a device, for example. The user control (here, increase volume) may be configured to control a first volume setting of audio player 352, for example. The "increase volume" is just one example user control that may be selected using different fingers, for example. Other user controls associated with controlling settings on an audio player executing on the device may include decrease volume, changing the bass, balance, or a wide variety of other controls 354, for example.

Figure 3C:
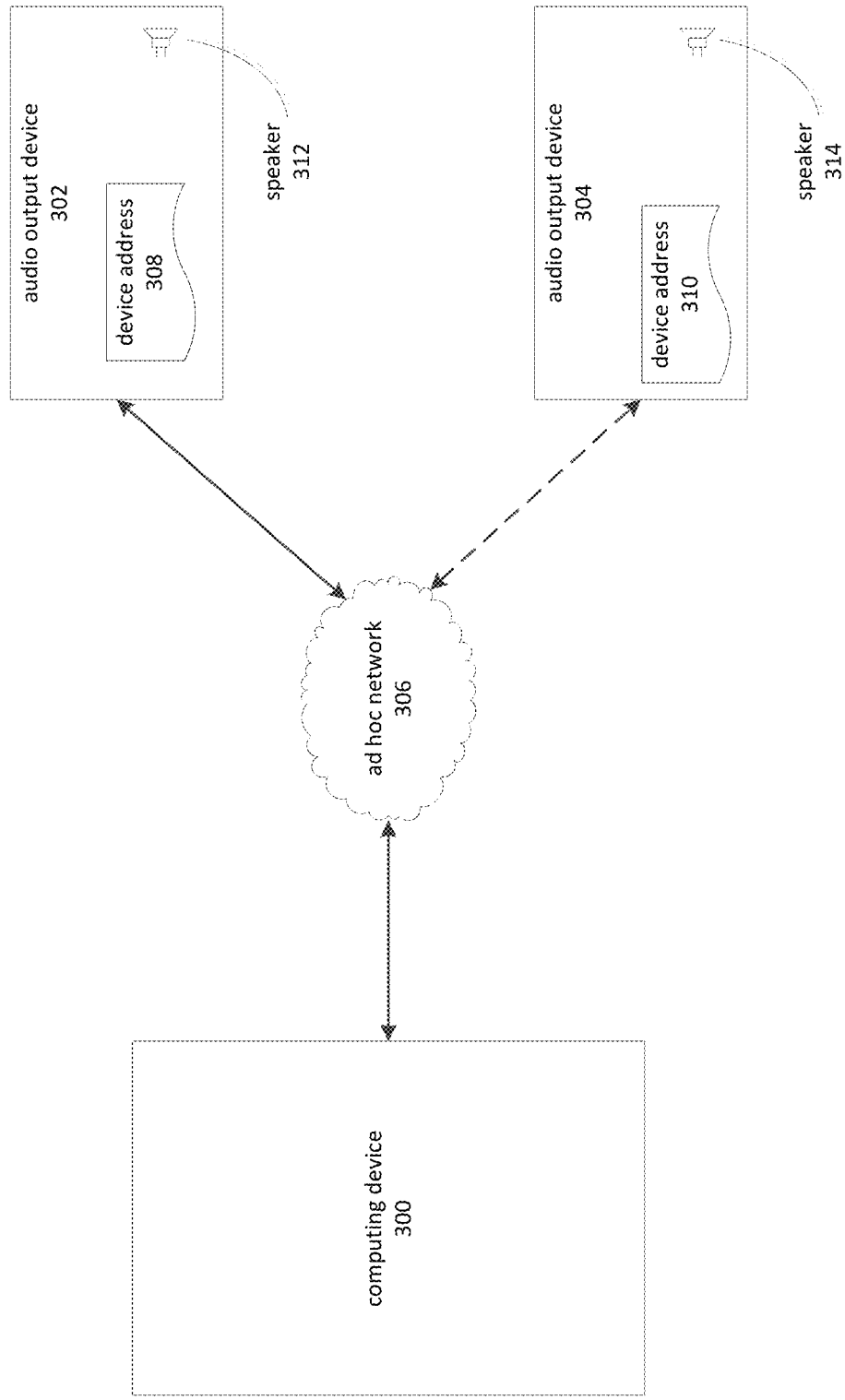
FIG. 3c illustrates an example system for device control according to another embodiment.

FIG. 3c is a diagram depicting an example an example system for device control. In one example embodiment, a computing device 300, such as a smartphone, may include a fingerprint sensor and interface with and control other electronic devices, such as earpiece speakers, for example. Control of an audio output device such as a Bluetooth earpiece may include, for example, the control of audio volume output by Bluetooth-enabled audio output devices. A computing device 300 may participate in an ad hoc network 306. A first audio output device 302 and a second audio output device 304 may also participate in the ad hoc network 306.

The computing device 300 may be a personal computer, tablet computer, smartphone, radio, digital audio source, and so forth. The computing device 300 may comprise one or more processors, a memory, and various input/output devices. The computing device 300 may also comprise networking hardware for participating in the ad hoc network 306, potentially including Ethernet, Wifi, and Bluetooth interfaces. In some implementations, an audio stream and control data may be transmitted from the computing device 300 to one or both audio output devices 302, 304.

Figure 4:
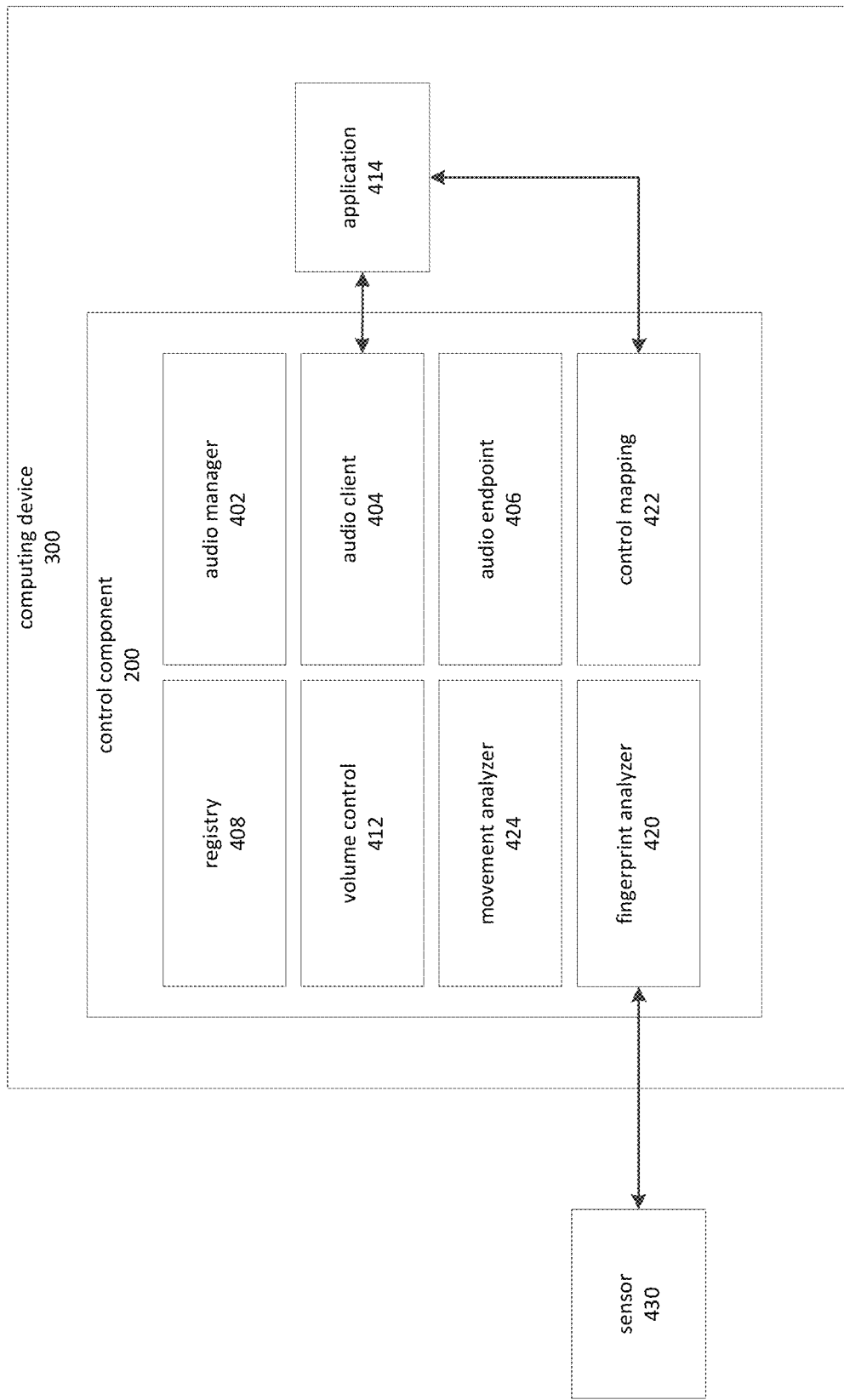
FIG. 4 illustrates an example of a device control component of a computing device according to another embodiment.

FIG. 4 is a diagram depicting an example of a control component of a computing device. In various embodiments, the computing device 300 may comprise an audio management component, one or more audio client components, one or more audio endpoint components, one or more sensors, and one or more fingerprint analyzers, and one or more control mapping components.

An audio manager component 402 may include a portion of memory of a computing device 300. The memory may bear instructions for managing aspects of audio playback by the computing device 300. These aspects may include management of audio volume output by endpoint audio devices. The audio manager component 402 may be referred to, in some instances, as a volume manager.

An audio client component 404 may include a portion of memory of the computing device 300 on which further instructions for managing aspects of audio playback are stored. The instructions may be for aspects of audio playback related to facilitating communication between an application 412 which generates audio and an endpoint audio device which may play the generated audio. The audio client component 404 may sometimes be referred to as a volume manager client.

An audio endpoint component 406 may include a portion of memory of the computing device 300, on which further instructions for managing aspects of audio playback are stored. The instructions may be for aspects of audio playback related to a communications channel between the computing device 300 and audio output device 302, 304.

A registry component 408 may include a portion of memory of the computing device 300 on which instructions for storing and retrieving information are stored. The registry component 408 may further comprise a persistent data store, such as a dedicated portion of a disk drive or solid-state memory.

A user may initiate a volume change on the computing device 300 using one of the fingerprint-based techniques described herein. The volume change may, for example, be initiated by tapping or touching a fingerprint sensor. It should be understood that corresponding control actions may also be performed using a "volume up" or "volume down" button or via a software-based virtual control or other means that are available to the computing device 300. These and other components for adjusting volume may be referred to as a volume control 412.

The volume control 412 may signal the audio client 404 to provide notification of the requested volume change to other components, such as the audio endpoint 406. The audio client 404 may, in some embodiments, determine which endpoint devices and audio stream(s) are affected by the volume change.

A device such as a device depicted in FIGS. 1-4 may include a fingerprint detector or a fingertip movement (lateral and rotational) detector (or both), for example. Fingerprint sensors such as sensor 430 of FIG. 4 may be included in many devices such as mobile phones, and are typically used to unlock the phone. When used as a security feature, a user's fingerprint needs to be detected with extremely high-confidence so that the fingerprint is unambiguously identified as an authorized finger with a high degree of confidence against other possible users. When the fingerprint is used to control a function such as volume control, it is sufficient to distinguish between a number of fingers that are needed to distinguish between desired functions for the device or application. For example, if each of the user's fingers are to be assigned to different functions, then up to ten fingers may need to be distinguished. Alternatively, the fingerprint sensor, or another sensor that is co-located with the fingerprint sensor, may be configured to detect a movement of the finger (e.g., sliding up/down, rotating) and/or the orientation of the finger when touching the sensor area.

In one embodiment, the identification of the finger and the detection of a movement or rotation of the finger may be performed independently of one another. In other embodiments, the detection of a movement or rotation of the finger may be performed dependent of the identification of the finger. In some embodiments, identification of the artifacts of the finger to identify the finger and identification of the artifacts of the finger to identify a movement of the finger may be different.

In an embodiment, the fingerprint of a user may be determined by fingerprint analyzer 420 that is configured to recognize a finger based on fingerprint data provided by sensor 430. In some embodiments, fingerprint analyzer 420 may recognize fingerprints using a fingerprint recognizer that has been trained to distinguish between different fingers using a learning function.

In an embodiment, the movement of a fingerprint of a user may be determined by movement analyzer 424 that is configured to recognize a movement such as a tap, swipe, or rotation of a finger based on movement data provided by sensor 430. In some embodiments, movement analyzer 424 may recognize movements using a movement recognizer that has been trained to distinguish between different movements using a learning function.

In some embodiments, an application on the device may be employed to facilitate the user interaction during the fingerprint and movement learning process. In one embodiment, the fingerprint data and movement data may be analyzed by a pattern classification function to learn and classify the data.

Figure 5A:
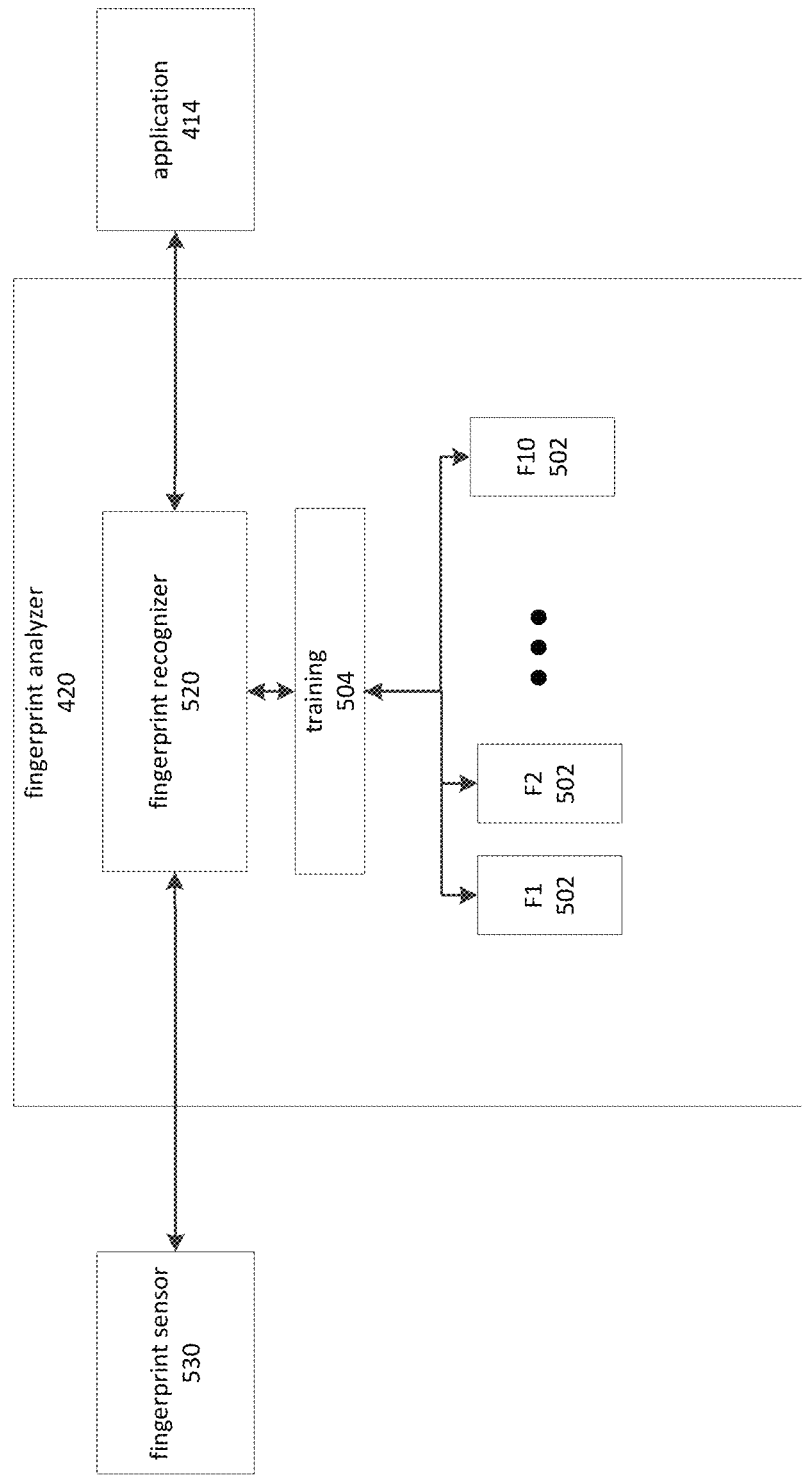
FIG. 5a illustrates an example fingerprint analyzer according to an embodiment.

FIG. 5a illustrates an example fingerprint analyzer 420 that may correspond to, for example, fingerprint analyzer 420 of FIG. 4. Fingerprint analyzer 420 may include a fingerprint recognizer 520 that is configured to receive data from a fingerprint sensor 530 and provide results of the recognition process to an application 414. The fingerprint recognizer 520 may include a training component 504 that is configured to train the recognizer to execute a classifying function that receives data captured by fingerprint sensor 530 and analyze the data to classify the data as one of a number of learned finger profiles. In the example shown in FIG. 5a, ten finger profiles 502 are characterized as F1, F2 . . . F10. For example, each finger of a user may be scanned by fingerprint sensor 530 to produce fingerprint data corresponding to each finger. In this example, a finger profile may correspond to fingerprint data for each finger scanned during a training process. For training purposes, a plurality of fingerprint data for each finger may be obtained. Features of each fingerprint may be extracted from the fingerprint data and used to train fingerprint recognizer 520, for example. Features of a particular finger extracted from fingerprint data may also be included in finger profiles 502, for example.

Figure 5B:
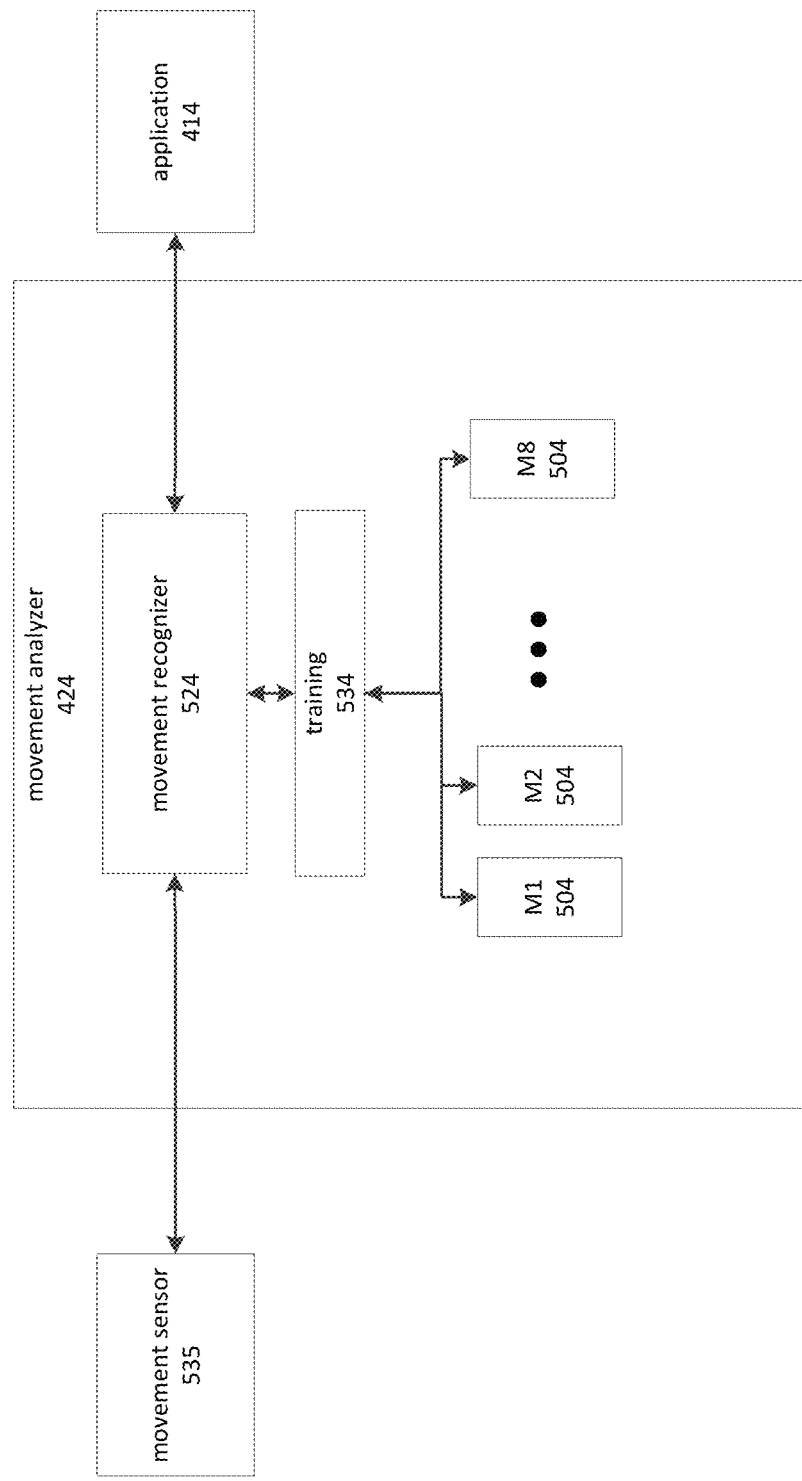
FIG. 5b illustrates an example movement analyzer according to an embodiment.

FIG. 5b illustrates an example movement analyzer 424 that may correspond to, for example, movement analyzer 424 of FIG. 4. Movement analyzer 424 may include a movement recognizer 524 that is configured to receive data from a movement sensor 430 and provide results of the recognition process to application 414. Movement sensor 430 may be a fingerprint sensor or a sensor for detecting movement and gestures independent of the fingerprint sensor, for example. The movement recognizer 524 may include a training component 534 that is configured to train the recognizer to execute a classifying function that receives data captured by movement sensor 535 and analyze the data to classify the data as one of a number of learned movement profiles. In the example shown in FIG. 5b, eight movement profiles 504 are characterized as M1, M2 . . . M8.

The classifying function that is used by fingerprint analyzer 420 and movement recognizer 524 may be implemented, for example, using a Naive Bayes classifier, fuzzy logic, and/or other methods. For example, the classifying function may include a learning function to learn which fingerprint or movement data patterns are associated with a particular user and user finger. In some embodiments, the classifying function may be configured to classify observations made from the fingerprint or movement sensor. The classifying function may be configured to learn which fingerprint or movement observations are alike and assign scores or other metadata to identify these observations. The classifying function may classify observations into categories corresponding to a finger or movement profile. In some embodiments, an algorithm, such as a feature subset selection algorithm or an induction algorithm, may be implemented to define fingerprint or movement groupings or categories. Probabilistic approaches may also be incorporated. One or more estimation methods may be incorporated, such as a parametric classification technique. In various embodiments, the classifying function may employ a combination of probabilistic and heuristic methods to guide and narrow the fingerprint or movement data that are analyzed. In order to provide relevant results that are more likely to indicate a finger for a particular observed pattern of data, the most relevant patterns may be identified and weighted. In some embodiments, a heuristic model can be used to find satisfactory classifications that provide an acceptable confidence level in the results. As an example, Markov modeling or variations thereof (e.g., hidden Markov model and hierarchical hidden Markov model) can be used in some embodiments to identify possible classifications. Monte Carlo methods and finite element analysis can also be used to generate results in various embodiments.

The use of fingerprints or finger movements, or both, to control functions of a device may allow for more intuitive control actions. The user's fingers may be used to encode a desired action, and may further be combined with a characteristic movement or the finger's orientation to further distinguish a control activity (e.g., increase/decrease of a parameter). An example may be an audio equalizer, i.e., a device or function configured to set high, medium, and low tone levels individually or, in some implementations, split the spectrum more finely into more distinct bands. The finger can indicate the frequency band, e.g., starting from the lowest frequencies for the thumb to the highest frequencies represented by the small (pinky) finger. As the size, in particular the thickness of the thumb, is larger than the small finger, this is an intuitive assignment, as frequency is also related to size in the case of musical instruments (e.g., bass, tenor, and soprano saxophones getting smaller and thinner with higher and higher frequency).

For illustration purposes, some example embodiments are described below. The disclosure is not limited to the examples provided below, and additional implementations may be incorporated using the principles disclosed herein.

Figure 6:
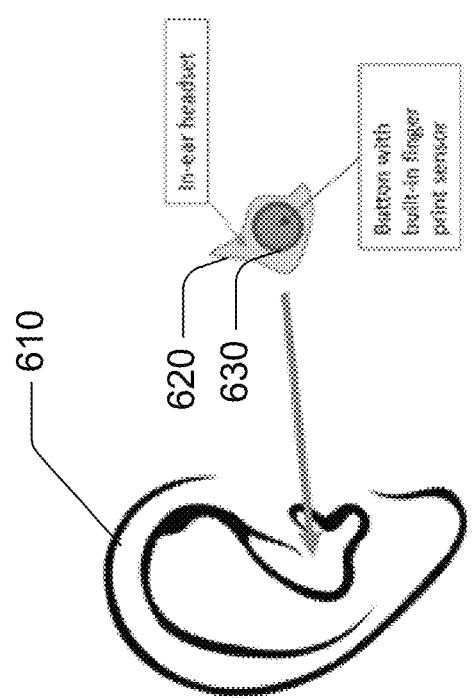
FIG. 6 illustrates an example implementation of fingerprint-based control according to another embodiment.

In one embodiment, an earpiece topology as shown in FIG. 6 may be implemented. The earpiece 620 may be inserted in (or configured proximate to) a user's ear 610 and may include sensor 630. The earpiece 620 may be coupled to another device such as a smartphone (not shown in FIG. 6). The sensor 630 may be configured to obtain data indicative of a user's fingerprint and send the data to fingerprint analyzer 420 of FIG. 4. The fingerprint analyzer 420 may be on the earpiece 620 or may run on another device that is in communication with the earpiece 620. A classification function running on fingerprint analyzer 420 may be configured to learn and distinguish a set of up to 10 fingers. Additional fingers may be learned if the classification function is configured to distinguish fingers for more than one user.

In an embodiment, the fingerprint sensor 630 or an additional gesture sensor may be configured to detect motion of a finger. In some embodiments, the detection of movement of a finger may be incorporated into the sensor 630. For example, the motion may be a linear movement (up-down/left-right) or a rotating movement (clock-wise; counter-clockwise). In an embodiment, the sensor 630 or an additional gesture sensor may also be configured to detect an orientation of a finger. For example, the angle of the finger while touching the sensor with respect to a reference point may be detected. In one embodiment, sensor 630 may be configured to obtain data indicative of a finger movement and/or rotation fingerprint and send the data to movement analyzer 424 of FIG. 4. The movement analyzer 424 may be on the earpiece 620 or may run on another device that is in communication with the earpiece 620. A classification function running on movement analyzer 424 may be configured to learn and distinguish one or more movements or rotations. In one embodiment, the classification function may be configured to detect a movement of the finger using one or more detection points that indicate that a finger on the sensor has moved a minimum distance during a time threshold. In some embodiments, the classification function may be configured to detect presence or absence of a finger with a specified refresh rate to identify movement. In some embodiments, the movement analyzer 424 may reside in a device other than the fingerprint identification. This may be advantageous as the movement detection may be done with less latency compared to finger detection, which may allow for quicker feedback to the user, e.g., to set the desired volume level without overshooting the desired setting.

The sensor 630 and/or classification function may determine a contact or other indication of an action. In one embodiment, the contact may be the user finger or other part of the user contacting the surface of the sensor. In another embodiment, the action may be bringing the user finger near the sensor. Other methods of starting an operation or otherwise contacting a sensor may be implemented.

In one embodiment, the sensor 630 and/or classification function may determine the initial contact position of the user's fingertip. The sensor 630 and/or classification function may determine if the user's fingertip has moved beyond a threshold, which may be a distance, rate, or acceleration, or some other indication of movement. In one embodiment, the threshold may be set to the minimum distance. If the threshold has been exceeded, then the sensor 630 and/or classification function may classify the user input as a lateral movement or a swipe. If the threshold has not been exceeded, the sensor 630 and/or classification function may determine if the user's fingertip has remained in contact with the sensor 630 during a time threshold. If the user's fingertip was not in contact with the sensor 630 before expiration of the time threshold, then the sensor 630 and/or classification function may classify the input as a tap.

If the user's fingertip was still in contact with the sensor 630 after the time threshold, the sensor 630 and/or classification function may determine if a distance threshold was exceeded. If the second move threshold was not exceeded, then the fingerprint sensor 630 and/or classification function may classify the input as a long press.

The fingerprint sensor 630 and/or classification function may determine movement of the user's fingertip by detecting that the fingertip has moved laterally across the sensor 630 or rotated over a portion of the sensor 630. The sensor 630 may include a touch sensitive area, optical sensors, or other sensors that can detect presence and/or movement of a user's finger. In one embodiment, sensors may be located in the sensor area to detect both lateral and rotational movement of the user's fingertip. In some embodiments, sensors may be placed in a ring to detect rotation as well as lateral movements. Additionally, the sensors may be placed as needed at the perimeter or in a pattern in order detect movement in a lateral or rotational direction or both.

Once the type of movement has been detected, the movement may be mapped to corresponding control actions that may be invoked based on predetermining mappings between various fingers/gestures and control actions.

The recognition of a particular user finger may allow for preventing against unintended operation by requiring a specific finger to be recognized in order to perform certain functions. For example, the power off command may be limited to a particular finger in order to reduce the likelihood of an inadvertent power off action. Furthermore, adding the requirement for a specified gesture may further reduce the likelihood of an inadvertent power off action or other action.

In some embodiments, the fingerprint sensor 630 and/or the movement detection function may include a pressure sensor to detect the pressure with which the user is pressing the fingerprint sensor. The pressure indication may be used to further control, in conjunction with fingerprint recognition, the adjustment of a volume or other settable level. In other words, increasing or decreasing pressure, which is typically exercised by moving the finger closet to (or actually into) the sensor can also be regarded as a gesture, just as a lateral or rotational movement.

In some embodiments, in addition to distinguishing between a tap and a long press, the time period during which the user is pressing on the fingerprint sensor may be used to control a function. For example, by pressing the fingerprint sensor for a continuous time of a first duration, a volume up control may be activated, and continuous pressing of the fingerprint sensor may cause the volume to increase at a predetermined rate.

In some embodiments, in addition to detecting the movement of a user's finger, the speed of the movement or rotation may be used to control a function. For example, a quick rotation of the user's fingertip may indicate a large jump in volume.

To further illustrate the disclosed techniques, the following examples are provided in the context of controlling earpiece 610 as illustrated in FIG. 6.

Figure 7:
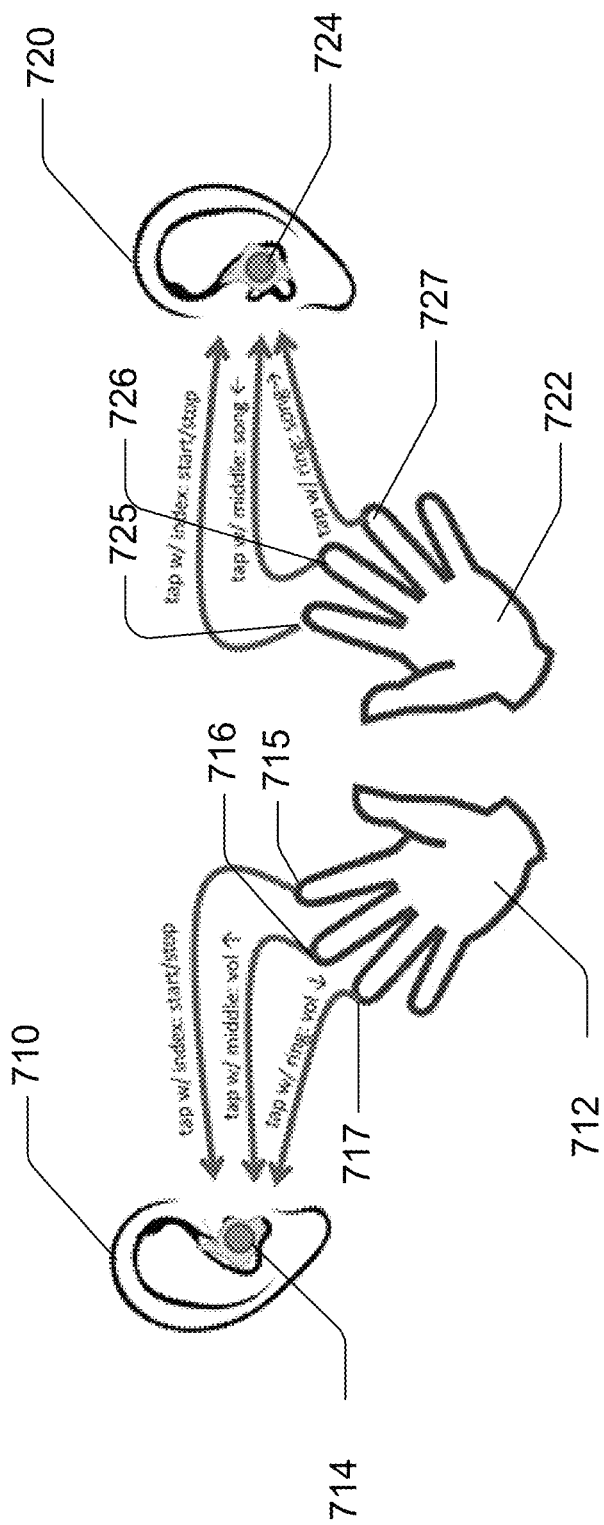
FIG. 7 illustrates an example implementation of fingerprint-based control according to another embodiment.

In one example, finger detection may be implemented without gesture recognition and without detection of a change in orientation of the finger. With reference to FIG. 7, illustrated is a right-hand 712 showing an operating button of earpiece 714 in the right ear 710 of a user. In this example, the following inputs may be defined:

index finger 715: start/stop playing music; accept incoming call/end call middle finger 716: volume up ring finger 717: volume down Further illustrated is a left-hand 722 contacting an operating button of earpiece 724 in the left ear 720. In this example, the following inputs may be defined:

index finger 725: start/stop playing music; accept incoming call/end call middle finger 726: backward 1 song, while playing music ring finger 727: forward 1 song, while playing music.

Additionally, the following encoding combinations can be considered:

right hand middle finger 716 indicates volume up, and each subsequent "short tap" within a short period (e.g., 2 seconds) causes one more step up in volume. A "short tap" can possibly be of "shorter duration" than a tap of a certain minimum duration that is required for fingerprint identification. Additionally, fingerprint detection may not be required for subsequent short taps.

In another example, fingerprint detection may be implemented with cross-hand operation. In this example, the right-hand operating button of the earpiece may be inserted in the left ear. This type of user interaction may be less intuitive and may be reserved for less frequent operations. Additionally, such cross-hand user interactions may provide better protection against unintended operations since it is less likely to inadvertently touch the right hand to the left ear. Furthermore, by allowing cross-hand controls, it may be possible to double the commands available for a device as compared to one hand per side. Lastly, by allowing for cross-hand control, only one of two earpieces need be equipped with a fingerprint sensor without reducing the number of distinguishable commands. More generally speaking, additional commands can be realized by distinguishing both different fingers and different finger print sensors. More specifically, by deploying S fingerprint sensors, each able to distinguish F fingers allows S*F distinguishable commands. In this way the number of commands may be increased compared to the number of finger print sensors or distinguishable fingers.

In this example, the following user commands may be implemented:

index finger: place device into standby mode middle finger tapping and sliding upwards: connect/reconnect with another device for pairing middle finger tapping & sliding downwards: disconnect from paired device.

Figure 8:
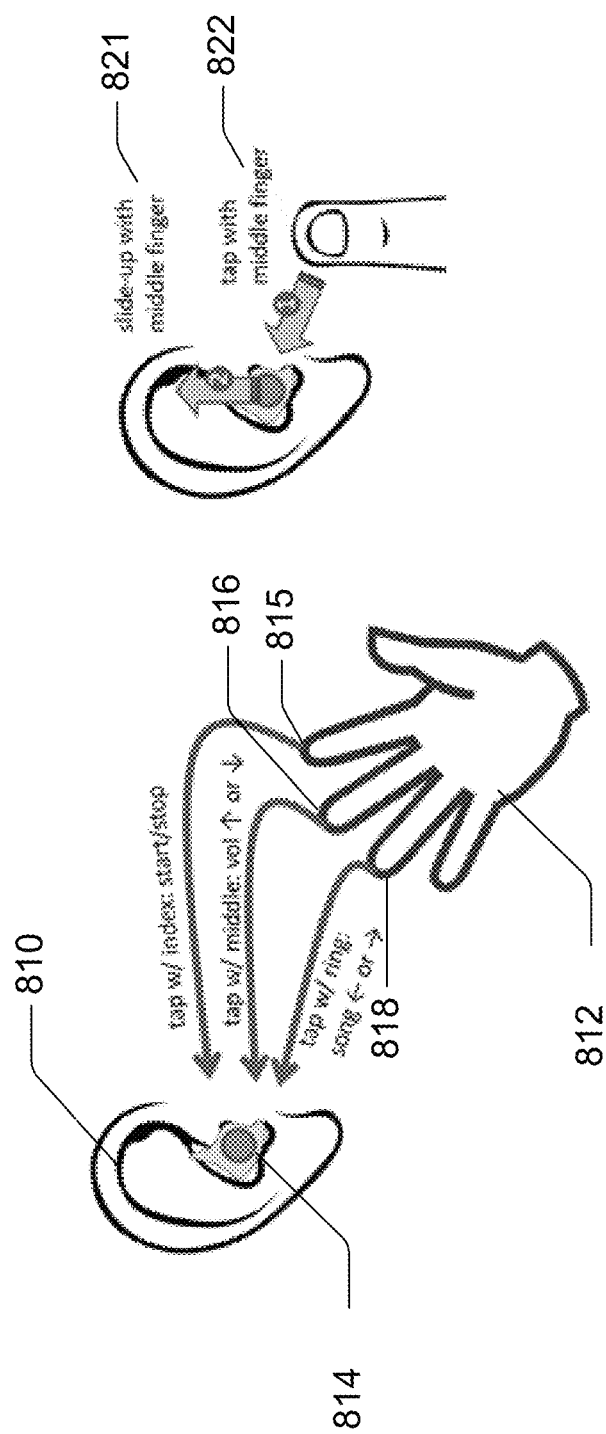
FIG. 8 illustrates an example implementation of fingerprint-based control according to another embodiment.

In another example, fingerprint detection may be implemented with movement detection where the movement is a lateral movement. With reference to FIG. 8, illustrated is a right-hand operating button of an earpiece 814 in the right ear 810 as controlled by right hand 812. In this example, the following user commands may be configured:

index finger 815: start/stop playing music; accept incoming call/end call middle finger 816 tapping 822 and sliding upwards 821: volume up middle finger 816 tapping 822 and sliding downwards: volume down ring finger 818 tapping and sliding upwards: forward one song, while playing music ring finger 818 tapping and sliding downwards: backward one song, while playing music further encoding combinations as discussed in conjunction with FIG. 7 may optionally be incorporated.

Figure 9:
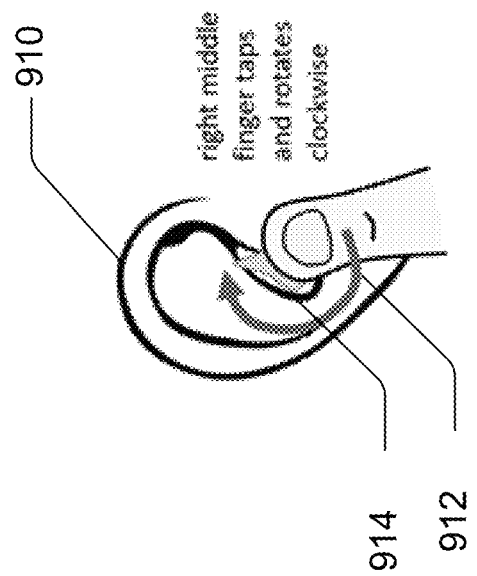
FIG. 9 illustrates an example implementation of fingerprint-based control according to another embodiment.

In another example, fingerprint detection may be implemented with rotation detection. In this example, and with reference to FIG. 9, the right-hand operating button of earpiece 914 is inserted in the right ear 910. In this example, the following user commands may be implemented:

index finger: start/stop playing music; accept incoming call/end call middle finger tapping and rotating clockwise: volume up middle finger tapping and rotating counter-clockwise: volume down ring finger tapping and rotating clockwise: forward one song, while playing music ring finger tapping and rotating counter-clockwise: backward one song, while playing music Additionally, encoding combinations as shown in FIG. 7 can be incorporated.

Figure 10:
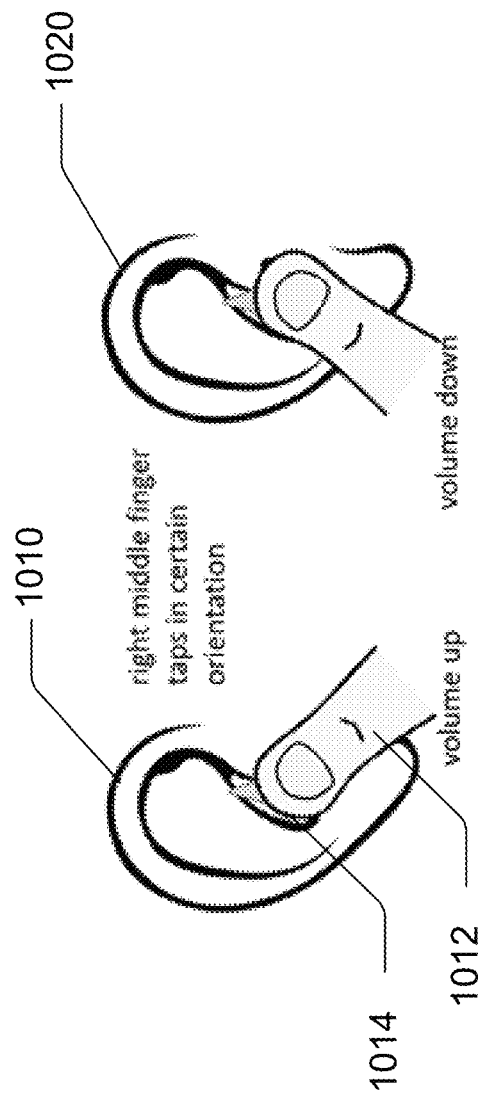
FIG. 10 illustrates an example implementation of fingerprint-based control according to another embodiment.

In another example, fingerprint detection may be implemented with finger angle/orientation. In this example, the right-hand operating button of earpiece 1014 is inserted in the right ear 1010. In this example, and with reference to FIG. 10, the following user commands may be implemented:

middle finger 1012 tapping with finger orientation towards front: volume up middle finger 1012 tapping with finger orientation towards back: volume down By tapping in the manner described, the input requirements on the user may be simpler to perform compared to the movement or rotation in the previous example, but may allow for one finger to indicate multiple commands using a similar input area (e.g., volume control) but with different movement (e.g., volume up or down). Other examples may include increasing/decreasing the rate of a media item (e.g., modifying the play rate of music to use for pacing during running), selecting the next/previous track, connect/disconnect with/from another device, and the like.

Figure 11:
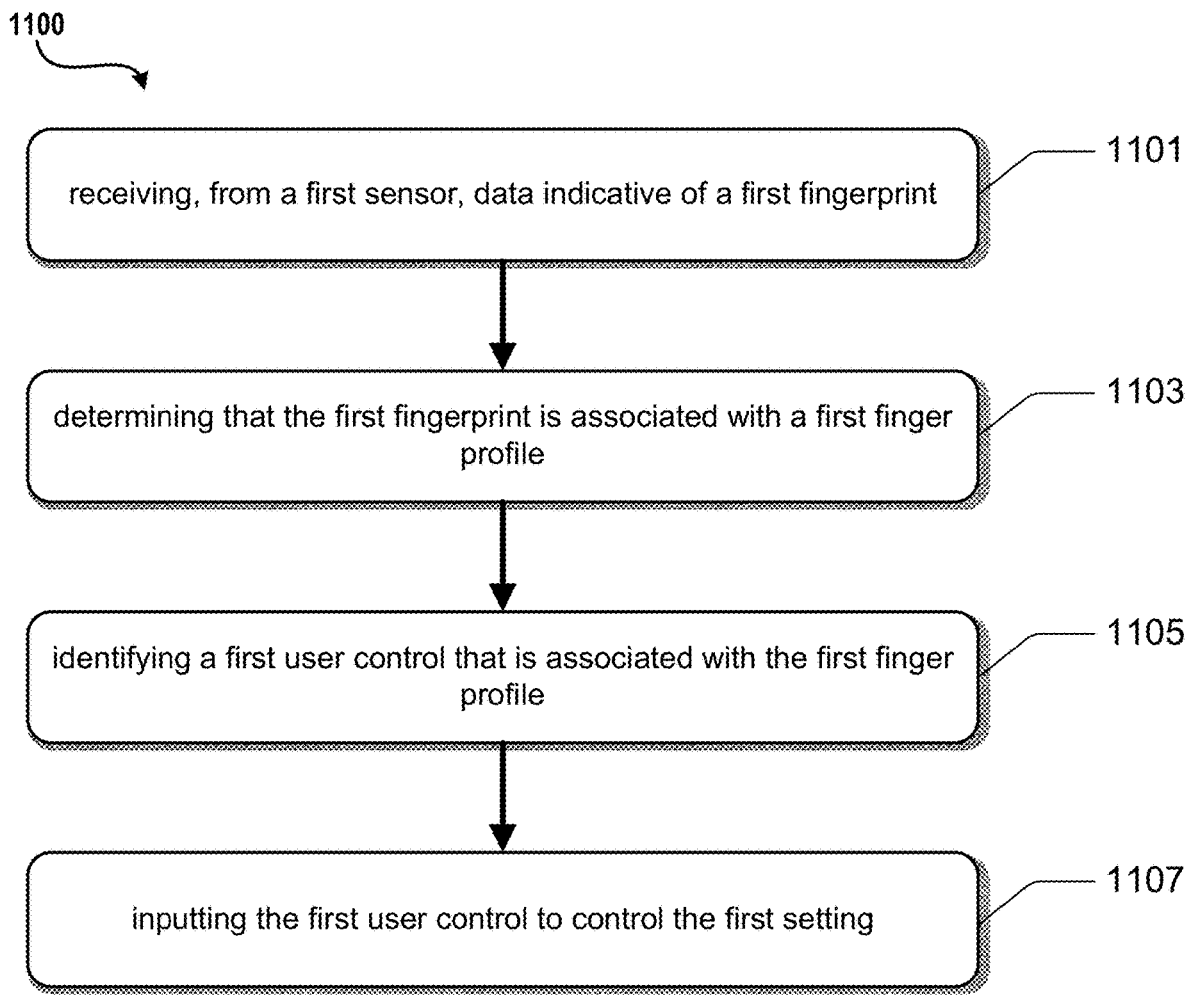
FIG. 11 illustrates a method according to an embodiment.

FIG. 11 illustrates an example operational procedure for controlling a device, in accordance with the present disclosure. The operational procedure may be implemented in a system comprising one or more computing devices. Referring to FIG. 11, operation 1101 illustrates receiving, from a first sensor, data indicative of a first fingerprint. In an embodiment, the data is captured in response to a first user finger being placed proximate to the first sensor.

Operation 1101 may be followed by operation 1103. Operation 1103 illustrates determining that the first fingerprint is associated with a first finger profile. In an embodiment, the first finger profile may be usable to distinguish a first finger from other fingers of a user of the device. In an embodiment, the determining is based on a first threshold. In an embodiment, the first threshold is based at least in part on a learning function that is trained using a plurality of fingerprint data.

Operation 1103 may be followed by operation 1105. Operation 1105 illustrates identifying a first user control (e.g., increase volume) that is associated with the first finger profile (e.g., the index finger). In an embodiment, the first user control may be configured to control a first setting (e.g., a volume setting) of a function executing on the device, such as an audio player, for example.

Operation 1105 may be followed by operation 1107. Operation 1107 illustrates inputting the first user control to control the first setting. For example, if an increase volume user control is identified based on a particular finger being detected, the increase volume control may be input to the audio player to control the volume.

Figure 12:
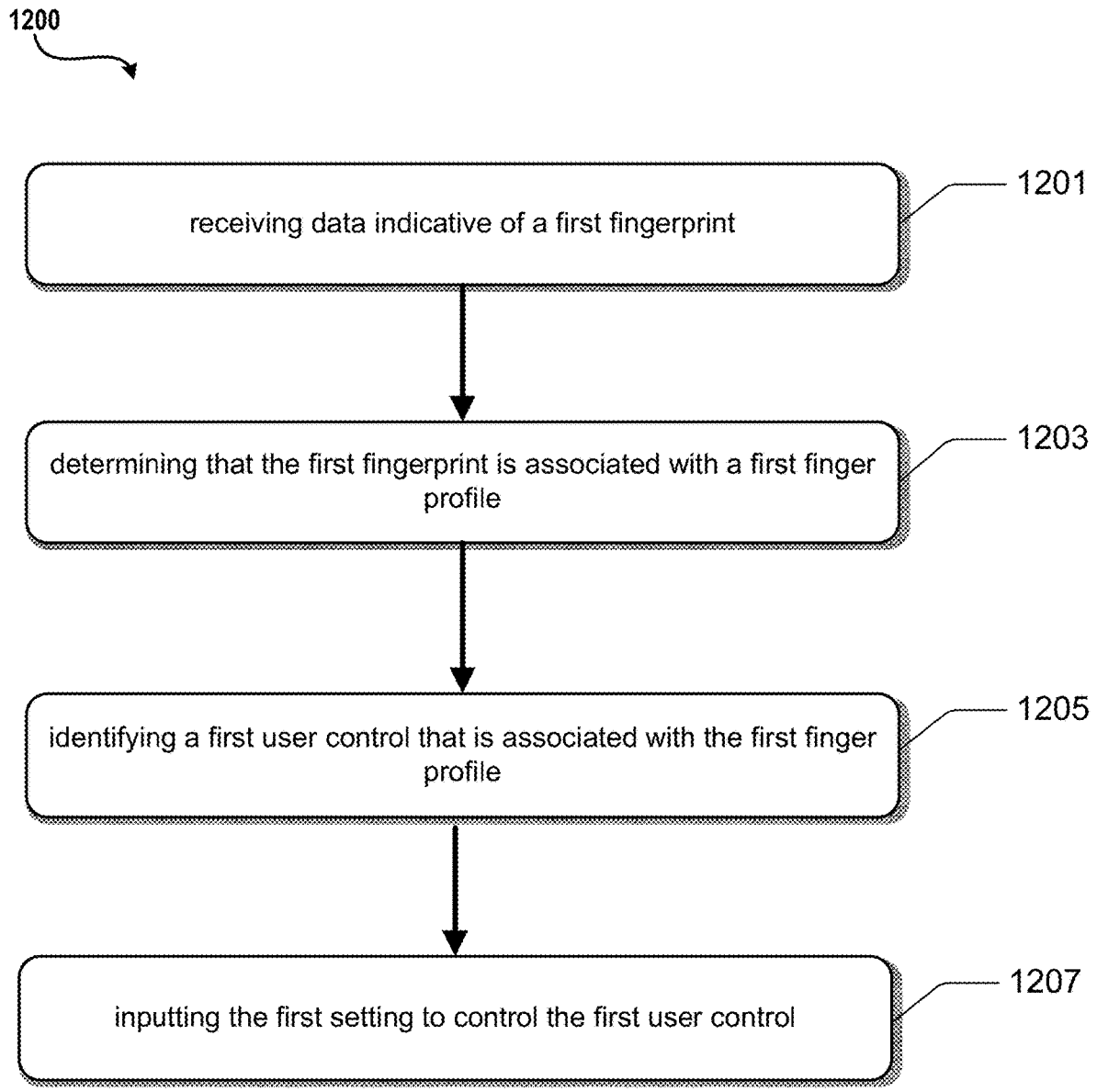
FIG. 12 illustrates a method according to an embodiment.

FIG. 12 illustrates an example operational procedure for controlling a device, in accordance with the present disclosure. The operational procedure may be implemented in a device comprising one or more processors, a fingerprint sensor, and a memory in communication with the one or more processors, the memory having computer-readable instructions stored thereupon which, when executed by the one or more processors, cause the device to perform operations comprising the operational procedure. Referring to FIG. 12, operation 1201 illustrates receiving data indicative of a first fingerprint from the fingerprint sensor.

Operation 1201 may be followed by operation 1203. Operation 1203 illustrates determining that the first fingerprint is associated with a first finger profile. In an embodiment, the first finger profile may be usable to distinguish a first finger from other fingers of a user. In an embodiment, the first threshold may be based at least in part on a learning function that is trained using a plurality of fingerprint data samples.

Operation 1203 may be followed by operation 1205. Operation 1205 illustrates identifying a first user control that is associated with the first finger profile. In an embodiment, the first user control may be configured to control a first setting of a function executing on the device. In some embodiments, a user control may be a control associated with a controllable aspect of a device or a function of the device, such as a volume control. In an embodiment, a setting may be a level, status, or other setting associated with a control that can be changed, such as a volume level, or power on/off.

Operation 1205 may be followed by operation 1207. Operation 1207 illustrates inputting the first setting to control the first user control.

Figure 13:
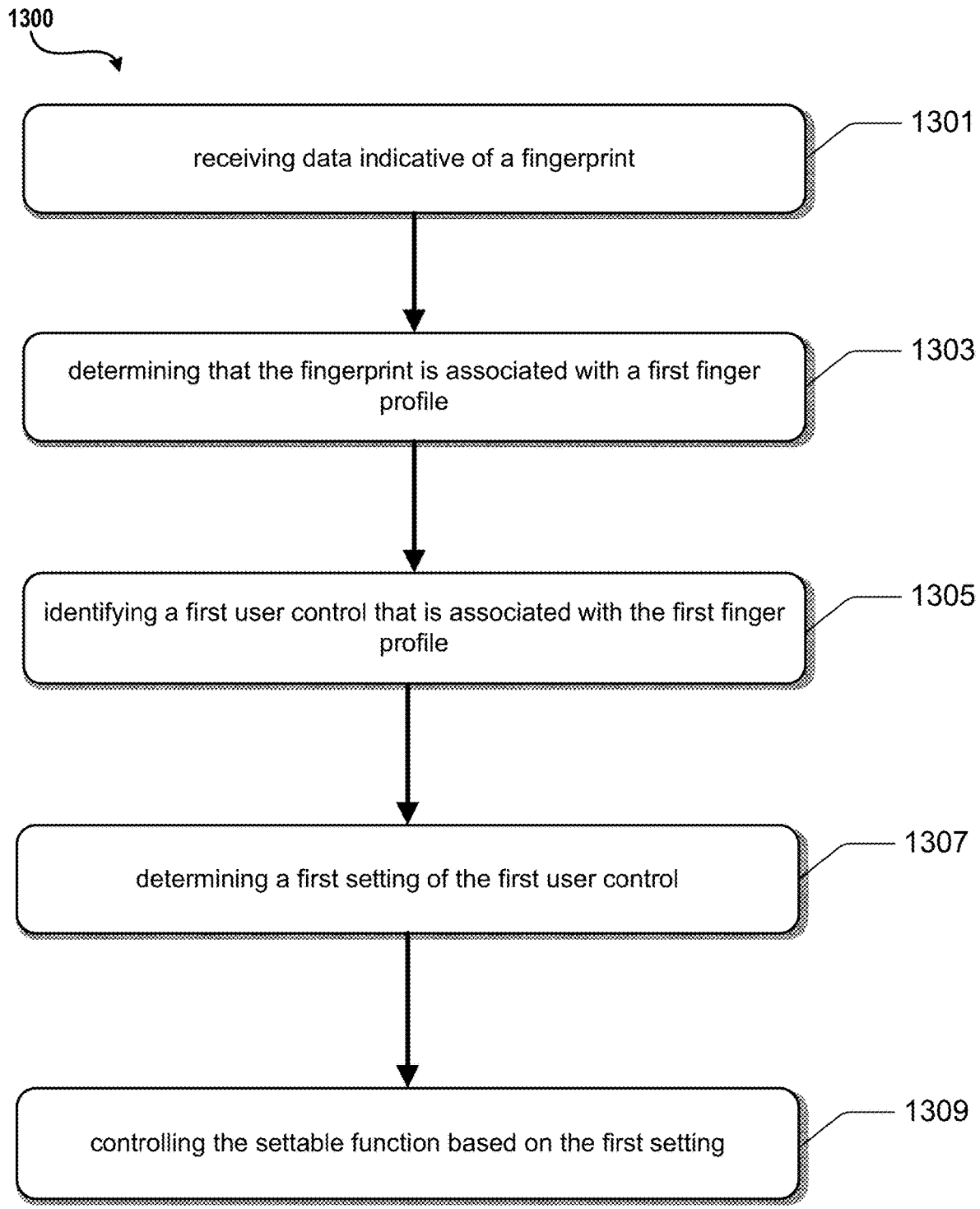
FIG. 13 illustrates a method according to an embodiment.

FIG. 13 illustrates an example operational procedure for controlling a device, in accordance with the present disclosure. The operational procedure may be implemented in a system comprising one or more computing devices. Referring to FIG. 13, operation 1301 receiving data indicative of a fingerprint.

Operation 1301 may be followed by operation 1303. Operation 1303 illustrates determining that the fingerprint is associated with a first finger profile. In an embodiment, the first finger profile usable to distinguish a first finger from other fingers of a user.

Operation 1303 may be followed by operation 1305. Operation 1305 illustrates identifying a first user control that is associated with the first finger profile. In an embodiment, the first user control is associated with a settable function of the device.

Operation 1305 may be followed by operation 1307. Operation 13097 illustrates based on the first finger profile, determining a first setting of the first user control.

Operation 1307 may be followed by operation 1309. Operation 1309 illustrates controlling the settable function based on the first setting.

Figure 14:
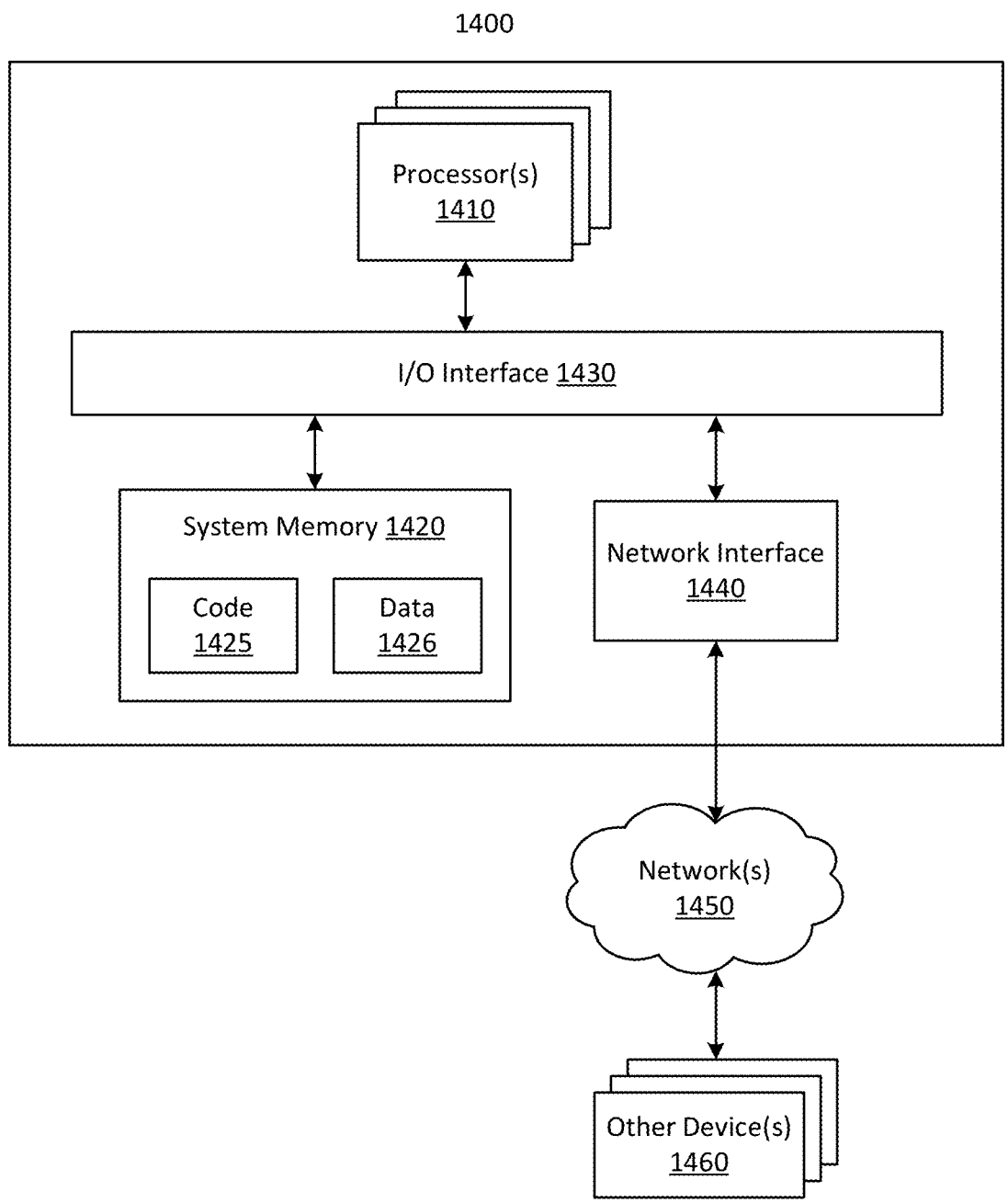
FIG. 14 illustrates hardware of a special purpose computing machine configured according to the above disclosure.

FIG. 14 and the following discussion are intended to provide a brief general description of a suitable computing environment in which the methods and systems disclosed herein and/or portions thereof may be implemented. Although not required, the methods and systems disclosed herein are described in the general context of computer-executable instructions, such as program modules, being executed by a computing device, such as mobile computing device such as a smartphone, smart watch, or other electronic devices (e.g., an ear piece). Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, and the like. The methods and systems disclosed herein may also be practiced in distributed computing environments where tasks are performed by remote processing devices that are linked through a communications network (e.g., a sensor on one device and processing (e.g., finger or movement recognition) on another device. In a distributed computing environment, program modules may be located in both local and remote memory storage devices.

In describing various examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The specific features, acts, and mediums are disclosed as example forms of implementing the claims In at least some embodiments, a computing device 1400 that implements a portion or all of one or more of the technologies described herein, including the techniques to implement the functionality described above, may include one or more processors 1410 configured to access one or more computer-accessible media (e.g., memory 1420). FIG. 14 illustrates such a general-purpose computing device 1400. In the illustrated embodiment, computing device 1400 includes one or more processors 1410 (which may be referred herein singularly as "a processor 1410") coupled to a system memory 1420 via an input/output (I/O) interface 1430. Computing device 1400 further includes a network interface 1440 coupled to I/O interface 1430.

In various embodiments, computing device 1400 may be a uniprocessor system including one processor 1410 or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. Processors 1410 may further be embodied as one or more microcontrollers, for example.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1420 as code 1425 and data 1426.

In one embodiment, I/O interface 1430 may be configured to coordinate I/O traffic between processor 1410, system memory 1420, and any devices, including network interface 1440 or other peripheral interfaces. In some embodiments, I/O interface 1430 may perform any necessary protocol, timing, or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other device or devices 1460 attached to a network or network(s) 1450, such as other computer systems or devices as illustrated in FIGS. 1 through 11, for example. In various embodiments, network interface 1440 may support communication via any suitable wired or wireless general data networks, such as types of Ethernet networks, for example. Additionally, network interface 1440 may support communication via telecommunications/telephony networks such as analog voice networks or digital fiber communications networks, via storage area networks such as Fibre Channel SANs or via any other suitable type of network and/or protocol.

In some embodiments, system memory 1420 may be one embodiment of a computer-accessible medium configured to store program instructions and data as described above for FIGS. 1-13 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1400 via I/O interface 1430. A non-transitory computer-accessible storage medium may also include any volatile or non-volatile media, such as RAM (e.g. SDRAM, DDR SDRAM, RDRAM, SRAM, etc.), ROM, FLASH, etc., that may be included in some embodiments of computing device 1400 as system memory 1420 or another type of memory. Portions or all of multiple computing devices, such as those illustrated in FIG. 14, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Various Notes & Examples

Each of these non-limiting examples may stand on its own, or may be combined in various permutations or combinations with one or more of the other examples.

Example 1 is a method (e.g., executing on a computer system, or embodied in instructions of a computer-readable medium) for controlling a device, the method comprising: receiving, from a first sensor, data indicative of a first fingerprint, wherein the data is captured in response to a first user finger being placed proximate to the first sensor; determining that the first fingerprint is associated with a first finger profile; identifying a first user control that is associated with the first finger profile, wherein the first user control is configured to control a first setting of a function executing on the device; and inputting the first user control to control the first setting.

In Example 2, the subject matter of Example 1 optionally includes, wherein: the determining is based on a first threshold and the first finger profile is usable to distinguish a first finger from other fingers of a user of the device.

In Example 3, the subject matter of any one or more of Examples 1-2 optionally include, wherein: the first threshold is based at least in part on a learning function that is trained using a plurality of fingerprint data.

In Example 4, the subject matter of Examples 1-3 optionally includes, further comprising: receiving, from the first sensor, data indicative of a second fingerprint, the data captured in response to a second user finger being placed proximate to the sensor; determining, based on a second threshold, that the second fingerprint is associated with a second finger profile, wherein the second finger profile is usable to distinguish a second finger from the first finger and other fingers of a user of the device; identifying a second user control that is associated with the second finger profile, wherein the second user control is configured to control a second setting of the function; and inputting the second user control to control the second setting.

In Example 5, the subject matter of any one or more of Examples 1-4 optionally include, wherein the first sensor is located on the device, and the device is communicatively coupled to a second device, wherein: the data is transmitted by the device to the second device; and the determining and identifying are performed by the second device.

6 Example 5, the subject matter of any one or more of Examples 1-5 optionally includes, further comprising: receiving data indicative of a first gesture performed by the first user finger; and identifying a second user control that is associated with the first gesture, wherein the second user control is configured to control a second setting of the function; and inputting the second user control to control the second setting.

In Example 7, the subject matter of any one or more of Examples 1-6 optionally includes, wherein: the data indicative of the first gesture is captured by a second sensor that is co-located with the first sensor; and the second sensor is configured to detect lateral or rotational movements of a proximate finger.

In Example 8, the subject matter of any one or more of Examples 1-7 optionally include, wherein: the first gesture is a lateral movement of the first finger; and the second user control is determined based on a speed or direction of the lateral movement.

In Example 9, the subject matter of any one or more of Examples 1-8 optionally include, wherein: the first gesture is a rotational movement of the first user finger; and the second user control is determined based on an angular velocity or degree of rotation of the rotational movement.

In Example 10, the subject matter of any one or more of Examples 1-9 optionally includes, wherein the first gesture is one or more of a tap, long press, lateral movement, or a rotation.

In Example 11, the subject matter of any one or more of Examples 1-10 optionally include, wherein the determining that the first fingerprint is associated with a first finger profile is based on a first threshold indicative of a likelihood that the first fingerprint matches the first finger profile.

In Example 12, the subject matter of any one or more of Examples 1-11 optionally include, wherein the first finger profile is a profile of a plurality of finger profiles that represent, based on fingerprints, fingers of the user.

In Example 13, the subject matter of any one or more of Examples 1-12 optionally includes, wherein the determining is performed based at least in part on a machine learning function that is trained using a plurality of fingerprint data samples.

In Example 14, the subject matter of any one or more of Examples 1-13 optionally include, wherein: the first finger profile is a profile of a plurality of finger profiles that represent, based on fingerprints, fingers of the user; and the plurality of finger profiles are associated with a plurality of user controls.

In Example 15, the subject matter of any one or more of Examples 1-14 optionally includes, wherein the data indicative of the fingerprint is classified as one of the plurality of finger profiles based on a machine learning function.

In Example 16, the subject matter of any one or more of Examples 1-15 optionally include, wherein the first finger profile is usable to distinguish a first finger from fingers of a plurality of users.

In Example 17, the subject matter of any one or more of Examples 1-16 optionally include, wherein the first user control is one or more of a power control, volume control, or a media playback function.

In Example 18, the subject matter of any one or more of Examples 1-17 optionally includes, wherein the first gesture is a rotational movement of the first finger, and first user control is settable at a plurality of levels that are mapped to an angular velocity or degree of rotation of the rotational movement.

Example 19 is at least one machine-readable medium including instructions for operation of a computing system, which when executed by a machine, cause the machine to perform operations of any of the methods of Examples 1-18.

Example 20 is an apparatus comprising means for performing any of the methods of Examples 1-18.

Example 21 is a device comprising: a fingerprint sensor; one or more processors; a memory in communication with the one or more processors, the memory having computer-readable instructions stored thereupon which, when executed by the one or more processors, cause the device to perform operations comprising: receiving data indicative of a first fingerprint; determining that the first fingerprint is associated with a first finger profile, the first finger profile usable to distinguish a first finger from other fingers of a user; receiving data indicative of a first gesture performed by the first finger; identifying a first user control that is associated with the first finger profile, wherein the first user control is associated with a communicatively coupled to the device; based on the first finger profile and the first gesture, determining a first setting of the first user control; and inputting the first setting to control the first user control.

In Example 22, the subject matter of Example 21 optionally includes, wherein the first gesture is one or more of a tap, long press, lateral movement, or a rotation.

In Example 23, the subject matter of any one or more of Examples 21-22 optionally include, wherein the determining that the first fingerprint is associated with a first finger profile is based on a first threshold indicative of a likelihood that the first fingerprint matches the first finger profile.

In Example 24, the subject matter of any one or more of Examples 21-23 optionally include, wherein the first finger profile is a profile of a plurality of finger profiles that represent, based on fingerprints, fingers of the user.

In Example 25, the subject matter of any one or more of Examples 21-24 optionally includes, wherein the determining is performed based at least in part on a machine learning function that is trained using a plurality of fingerprint data samples.

In Example 26, the subject matter of any one or more of Examples 21-25 optionally include, wherein the memory has computer-readable instructions stored thereupon which, when executed by the one or more processors, cause the device to perform operations comprising: receiving data indicative of a second fingerprint; determining that the second fingerprint is associated with a second finger profile, the second finger profile usable to distinguish the second finger the first finger and from other fingers of the user; receiving data indicative of a second gesture performed by the second finger; identifying a second user control that is associated with the second finger profile, wherein the second user control is associated with the device; based on the second finger profile and the second gesture, determining a second setting of the second user control; and inputting the second setting to control the second user control.

Example 27 is a non-transitory machine-readable medium storing a program executable by at least one processing unit of a device, the program comprising sets of instructions for: receiving data indicative of a fingerprint; determining that the fingerprint is associated with a first finger profile, the first finger profile usable to distinguish a first finger from other fingers of a user; receiving data indicative of a first gesture associated with the first finger; identifying a first user control that is associated with the first finger profile, wherein the first user control is associated with a settable function of the device; based on the first finger profile and the first gesture, determining a first setting of the first user control; and controlling the settable function based on the first setting.

In Example 28, the subject matter of Example 27 optionally includes, wherein: the first finger profile is a profile of a plurality of finger profiles that represent, based on fingerprints, fingers of the user; and the plurality of finger profiles are associated with a plurality of user controls.

In Example 29, the subject matter of any one or more of Examples 27-28 optionally include, wherein the data indicative of the fingerprint is classified as one of the plurality of finger profiles based on a machine learning function.

In Example 30, the subject matter of any one or more of Examples 27-29 optionally include, wherein the first finger profile is usable to distinguish a first finger from fingers of a plurality of users.

In Example 31, the subject matter of any one or more of Examples 27-30 optionally includes, wherein the first user control is one or more of a power control, volume control, or a media playback function.

In Example 32, the subject matter of any one or more of Examples 27-31 optionally includes, wherein the first gesture is a rotational movement of the first finger, and first user control is settable at a plurality of levels that are mapped to an angular velocity or degree of rotation of the rotational movement.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible and non-transitory computer-readable media, such as during execution or at other times. Examples of these tangible computer-readable media may include hard disks, removable magnetic disks, removable optical disks (e.g., compact disks and digital video disks), magnetic cassettes, memory cards or sticks, random access memories (RAMs), read only memories (ROMs), and the like.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for controlling a mobile device, the method comprising:
receiving, by the mobile device, from a remotely disposed headset or an earpiece having one or more sensors, data indicative of a first user finger and a gesture associated with the first user finger, wherein the data is captured in response to the first user finger performing the gesture proximate to the one or more sensors;
determining, by the mobile device, based on the received data, the first user finger, distinguishing the first user finger from other user fingers of a user or other users of the mobile device;
determining, by the mobile device, that the first user finger is associated with a first finger profile;
determining, by the mobile device, based on the data, the gesture associated with the first user finger;
identifying, by the mobile device, based on the determined gesture and the first finger profile, a first user control, wherein the first user control is configured to control a first setting of a function executing on the mobile device and outputting to the headset or earpiece; and
inputting, by the mobile device, the first user control to control the first setting;
wherein
the first setting of the first user control is volume increase if the first user finger is a middle finger, and the gesture is the middle finger tapping and sliding upward;
the first setting of the first user control is volume decrease if the first user finger is the middle finger, and the gesture is the middle finger tapping and sliding downward;
the first setting of the first user control is forward one song if the first user finger is a ring finger, the gesture is the ring finger tapping and sliding upward, and the function being executed is playing music; or
the first setting of the first user control is backward one song if the first user finger is the ring finger, and the gesture is the ring finger tapping and sliding downward, and the function being executed is playing music.

2. The method of claim 1, wherein the data are first data, and the gesture is a first gesture, and the method further comprises:
receiving, by the mobile device, from the headset or earpiece, second data indicative of a second user finger and a second gesture associated with the second user finger, wherein the second data is captured in response to the second user finger performing the second gesture proximate to the one or more sensors;
determining, by the mobile device, based on the received second data, that the second finger is associated with a second finger profile, wherein the second finger profile is usable to distinguish the second user finger from the first user finger and other fingers of the user or the other users of the mobile device;
determining, by the mobile device, based on the second data, the second gesture associated with the second user finger;
identifying, by the mobile device, based on the determined second gesture, a second user control, wherein the second user control is configured to control a second setting of the function; and
inputting, by the mobile device, the second user control to control the second setting.

3. The method of claim 2, wherein the mobile device is wirelessly coupled to the headset or earpiece, and wherein:
receiving comprises receiving the first and second data wirelessly transmitted by the headset or earpiece to the mobile device.

4. The method of claim 3, wherein:
the data indicative of the first or second user finger is captured by a first sensor of the one or more sensors of the headset or earpiece;
the data indicative of the first or second gesture is captured by a second sensor of the one or more sensors that is co-located with the first sensor on the headset or earpiece.

5. The method of claim 4, wherein:
the second gesture is a lateral movement of the first user finger, the second sensor being configured to detect lateral movement; and
the second user control is determined based on a speed or direction of the lateral movement.

6. The method of claim 4, wherein:
the second gesture is a rotational movement of the first user finger, the second sensor being configured to detect rotational movement; and
the second user control is determined based on an angular velocity or degree of rotation of the rotational movement.

7. A mobile device comprising:
a wireless receiver to wirelessly receive from a remotely disposed headset or earpiece having one or more sensors, data indicative of a first user finger and a gesture associated with the first user finger, wherein the data is captured in response to the first user finger performing the gesture proximate to the one or more sensors;
one or more processors;
a memory in communication with the one or more processors and the wireless receiver, the memory having computer-readable instructions stored thereupon which, when executed by the one or more processors, cause the mobile device to perform operations comprising:
determining, based on the received data, the first user finger, distinguishing the first user finger from other user fingers of a user or other users of the mobile device;
determining that the first user finger is associated with a first finger profile;
determining, based on the data, the gesture associated with the first user finger;
identifying, based on the determined gesture and the first finger profile, a first user control, wherein the first user control is configured to control a first setting of a function executing on the mobile device, and outputting to the headset or earpiece; and
inputting the first setting to control the first user control; wherein
the first setting of the first user control is volume increase if the first user finger is a middle finger, and the gesture is the middle finger tapping and rotating clockwise;
the first setting of the first user control is volume decrease if the first user finger is the middle finger, and the gesture is the middle finger tapping and rotating counter-clockwise;
the first setting of the first user control is forward one song if the first user finger is a ring finger, the gesture is the ring finger tapping and rotating clockwise, and the function being executed is playing music; or
the first setting of the first user control is backward one song if the first user finger is the ring finger, and the gesture is the ring finger tapping and rotating counter-clockwise, and the function being executed is playing music.

8. The device of claim 7, wherein the determining that the first user finger is associated with the first finger profile is based on a first threshold indicative of a likelihood that the first user finger matches the first finger profile.

9. The device of claim 7, wherein the first finger profile is a profile of a plurality of finger profiles that represent, based on fingerprints, fingers of the user.

10. The device of claim 7, wherein the data are first data, and the gesture is a first gesture, and the wireless receiver is to receive from the headset or earpiece, second data indicative of a second user finger and a second gesture associated with the second user finger, wherein the second data is captured in response to the second user finger performing the second gesture proximate to the one or more sensors, and wherein the operations further comprise:
determining that the second finger is associated with a second finger profile, the second finger profile usable to distinguish the second user finger from the first user finger and from other fingers of the user or other users of the mobilemobicl device;
determining, based on the second data, the second gesture associated with the second user finger;
identifying, based on the determined second gesture, a second user control, wherein the second user control is configured to control a second setting of the function executing on the mobile device; and
inputting the second setting to control the second user control.

11. A headset or earpiece, comprising:
a receiver to receive at least audio data from a remote mobile device;
a speaker coupled to the receiver to output audio in response to the received audio data;
one or more sensors to sense and generate sensor data indicative of a user finger and a gesture associated with the user finger, in response to the user finger performing the gesture proximate to the one or more sensors; and
a transmitter coupled to the one or more sensors to transmit the sensor data to the mobile device to determine, based on the sensor data indicative of the user finger and the gesture associated with the user finger, a control setting for a function executing on the mobile device outputting the audio to the headset or earpiece;
the control setting is volume increase if the user finger is a middle finger, and the gesture is the middle finger tapping and sliding upward;
the control setting is volume decrease if the first user finger is the middle finger, and the gesture is the middle finger tapping and sliding downward;
the control setting is forward one song if the first user finger is a ring finger, the gesture is the ring finger tapping and sliding upward, and the function being executed is playing music; or
the control setting is backward one song if the first user finger is the ring finger, and the gesture is the ring finger tapping and sliding downward, and the function being executed is playing music.

12. The headset or earpiece of claim 11, wherein the user finger is a selected one of the middle finger or the ring finger, wherein the one or more sensors are configured to generate sensor data indicative of the middle finger or the ring finger.

13. The headset or earpiece of claim 12, wherein the sensor data indicative of the middle finger or the ring finger are fingerprint data, and wherein the one or more sensors are configured to generate the fingerprint data indicative of the middle finger or the ring finger.

14. The headset or earpiece of claim 11, wherein the one or more sensors are further configured to sense the tap.

\* \* \* \* \*

UNITED STATES PATENT AND TRADEMARK OFFICE
CERTIFICATE OF CORRECTION

PATENT NO. : 11,023,067 B2
APPLICATION NO. : 16/226530
DATED : June 1, 2021
INVENTOR(S) : Tim Schoenauer et al.

Page 1 of 1

It is certified that error appears in the above-identified patent and that said Letters Patent is hereby corrected as shown below:

In the Claims

Column 22
Line 19, "…mobilemobicl…" should read – "…mobile…"

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*